INVENTORS
OLIVER C. AMES
RALPH L. JAESCHKE
EUGENE J. LACKI
BY

*Teagno & Stover*

ATTORNEYS

INVENTORS.
OLIVER C. AMES
BY RALPH L. JAESCHKE
EUGENE J. LASKI

ATTORNEYS

INVENTORS.
OLIVER C. AMES
BY RALPH L. JAESCHKE
EUGENE J. LACKI

ATTORNEYS

3,073,977
TRANSISTORIZED MAGNETIC AMPLIFIER CONTROL FOR ELECTROMAGNETIC COUPLING
Oliver C. Ames, Ralph L. Jaeschke, and Eugene J. Lacki, Kenosha, Wis., assignors to Eaton Manufacturing Company, Cleveland, Ohio, a corporation of Ohio
Filed Oct. 19, 1959, Ser. No. 847,143
11 Claims. (Cl. 310—94)

This invention relates in general to improvements in electrical control systems and more particularly to a control for dynamoelectric apparatus such as electromagnetic slip couplings, brakes, dynamometers and the like.

An object of this invention is to provide a control system of the class described which offers improved dynamic response, superior regulating characteristics, and which utilizes a speed responsive semiconductor control circuit as a preamplification means for driving a magnetic amplifier.

Another object of this invention is to provide a simple, compact control system capable of providing substantially increased power to control coils in apparatus of the class described which incorporate speed regulation as well as torque limiting features.

It is a further object of our invention to provide electrical systems which are rugged, reliable and economical for direct current control of dynamoelectric machines; the provision of control systems which require no vacuum tubes and satisfy requirements of the above mentioned kind with an accuracy and reliability of control and regulating performance superior to known systems.

Various other objects of the invention, advantages and its characteristic features will be in part apparent and in part pointed out as the description progresses.

It is recognized that magnetic amplifier control circuits per se and transistor control circuits per se are known in the art for controlling the excitation of a field coil in dynamoelectric apparatus such as eddy current clutches and the like. Speed regulation and torque limiting of such devices are shown, for example, in U.S. Patents 2,697,794 and 2,850,654, both assigned to a common assignee. Both of these methods are successful but the present invention incorporates improved design features which are simple, rugged and economical and which are better adapted to expand the capabilities of either the transistor control circuit or the magnetic amplifier control circuit.

Although transistors used for direct control of field coils of eddy current clutches and the like have characteristics of superior regulation and are satisfactory for fractional horsepower applications, difficulties arise, however, with the use of a direct transistor control due to the characteristic limitation of its low power handling capability which is restricted primarily by excessive heat generation; a direct magnetic amplifier control is known to be limited in regulation but has the capability of satisfying high power requirements.

As hereinafter explained, by utilizing a sensitive speed responsive transistor control as a preamplifier to drive a magnetic amplifier, which in turn controls, for example, a clutch coil, our control system expands the capabilities of either the transistor control per se or magnetic amplifier control per se by accentuating the excellent regulating or control features of a transistor control and the high power handling capabilities of a magnetic amplifier. The resultant output is highly desirous in electrodynamic apparatus of the type described requiring high power.

Certain distinct advantages may be appreciated in the present invention which utilizes a transistorized control circuit as a preamplification means for driving a magnetic amplifier. This distinguishes over the prior art which includes a saturable reactor type preamplifier having incorporated therein a control winding comprising thousands of turns specifically designed so as to hold the control current to a minimum value. The large number of turns, however, necessarily increases the effective time constant and therefore an interval of time exists before the magnetic amplifier will respond. This condition is substantially eliminated in the present invention.

Since the gain of a saturable reactor type preamplifier depends upon the power consumed in the control circuit, which includes the total resistance of the entire control circuit and the resistance of the signal source, it is essential that the resistance be maintained at a low value. The above system necessitates a large power supply; the transistorized preamplifier, however, requires a smaller power supply since the control circuit is measured in microamperes thereby allowing an increased input resistance. Because of the relatively low current requirement of the transistorized preamplifier, a higher reference voltage may be utilized and in turn, the generator feedback voltage may be stepped up through a simple voltage doubler. This combination along with the gain of the transistorized preamplifier increases the regulation of the output.

Other advantages of the present invention include its adaptability to printed circuits due to the low amount of power consumed in the transistorized preamplifier and the increased gain provided eliminates the need for negative feedback for increased stability.

The following illustrations are directed to eddy current clutches and brakes, and it will be readily apparent to those skilled in the art that this invention is adaptable to all types of electromagnetic apparatus wherein current flow through a field coil directly effects coupling. For example, dynamometers, clutches, and brakes may be readily utilized with our control system whether they be of the eddy current type, magnetic fluid type or the like.

The foregoing and other objects, features and advantages of the invention will be apparent from the description of the control system, various possible illustrations of which are shown in the following drawings.

Corresponding identifying characters in FIGURES 1 through 5 represent corresponding elements.

For purposes of illustration, the invention is shown to include in part the transistor control means disclosed in U.S. Patent No. 2,850,654, but it is understood that our invention is not restricted to the specific elements set forth in said patent. Although the embodiment shown in FIGURE 2 of said patent is incorporated by reference for the purpose of clearly illustrating a direct transistorized control circuit known in this art, it is further understood that other speed responsive transistorized control circuits could readily be substituted therefor, without distracting from the scope of this invention.

The internal operational characteristics of transistor control TR (enclosed in a dashed box arrangement in FIGURES 1 through 5), are fully explained in U.S. Patent 2,850,654. Briefly, said patent describes a sensitive speed responsive transistorized control means which energizes an illustrated clutch coil directly through the collector-emitter circuitry of its associated transistor to maintain the driven shaft speed at any preset level. More specifically, FIGURE 2 of U.S. Patent 2,850,654 requires that an adjustment be made initially on potentiometer P-1 to establish the desired speed of output shaft S. Should output shaft S increase or decrease in speed due to varying load conditions, the output from generator G which is proportional to the angular velocity of said generator, is applied to the transistor control circuit at points X—X and compensates for incipient load variations.

As previously discussed, transistor control TR illustrates one speed responsive transistor control circuit known in the art. Without distracting from the scope of this invention the structure of transistor control TR may be simplified, the requirements being the inclusion of at least one transistor having a base, emitter and collector, preferably of a common-emitter configuration having its collector-emitter circuit in series relation with a power source and the control winding of a magnetic amplifier. The base-emitter circuit of said transistor is preferably connected to an adjustable reference voltage source and a speed responsive voltage source in opposition to one another and in series with said base-emitter circuit. The speed responsive voltage source includes a generator driven by the shaft on the output side of the electromagnetic apparatus.

In view of the above, each of FIGURES 2 through 5 shows magnetic amplifier control winding 9 coupled to transistor control TR (dashed box arrangement) but it is to be understood more specifically that control winding 9 is preferably coupled in series relation to the emitter-collector circuit of a speed responsive transistor preamplifier means as described above, for example, or as shown in FIGURE 1.

Figure 1:
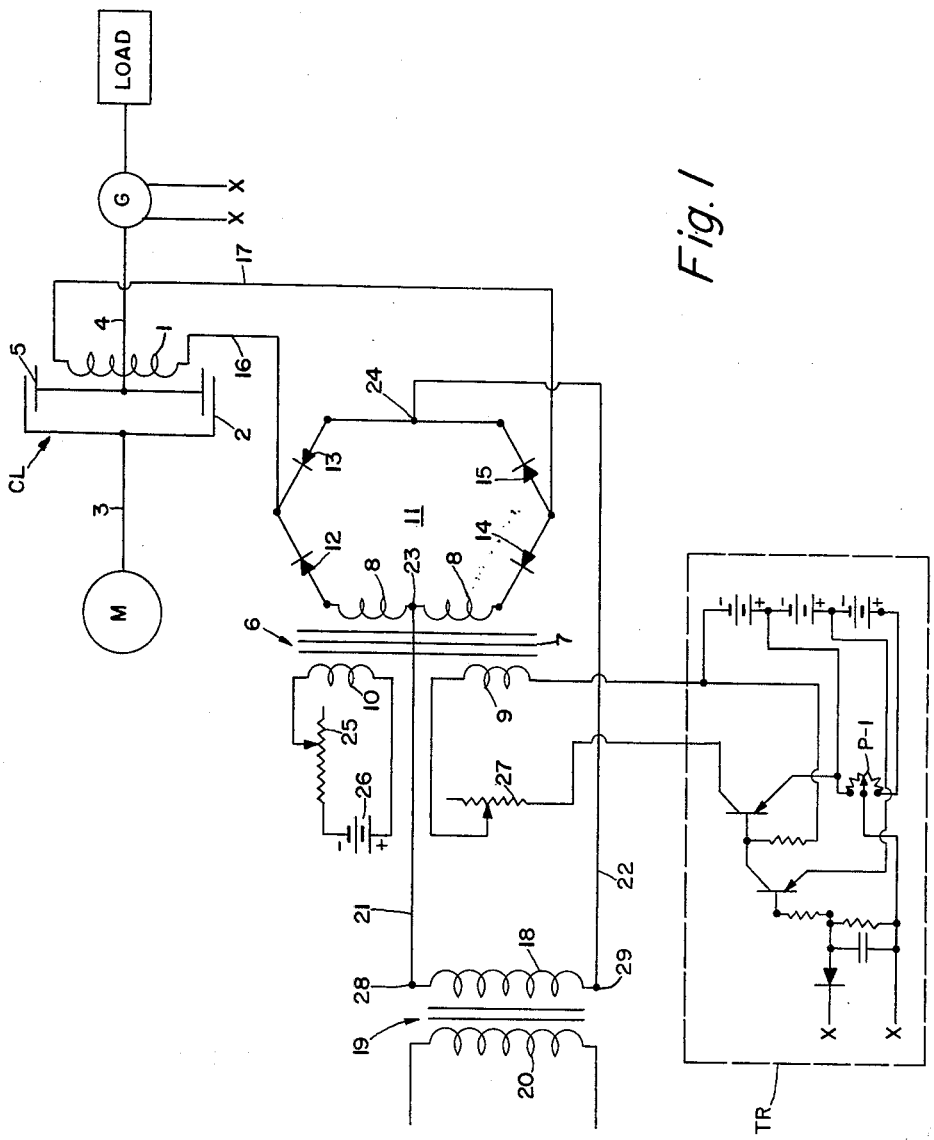
FIGURE 1 is a basic speed control system adapted for regulation of an eddy current clutch.

Referring now to the embodiment illustrated in FIGURE 1 of our invention, there is shown an inductive load in the form of a field coil 1 of an electromagnetic clutch. The coupling unit is identified as CL and includes a driving member 2 coupled to a drive shaft 3 and driven by a prime mover M; torque is transferred to a load via a driven shaft 4 and a driven member 5.

Generator G, preferably an A.C. permanent-magnet alternator, is mechanically coupled to driven shaft 4 and its developed potential is a function of the angular velocity of output shaft 4. The output leads X—X of generator G are connected to a transistor control TR at points X—X, within the dashed box as hereinbefore explained.

Magnetic amplifier 6 is of the self-saturating type comprising a saturable core reactor 7, a center tapped power winding 8, a control winding 9 and a bias winding 10. The load circuit includes a bridge rectifier 11, including rectifiers 12, 13, 14, and 15, having its D.C. output connected by leads 16 and 17 to field coil 1. Alternating current is fed through the reactor from a source including a secondary winding 18 of a supply transformer 19 and primary 20 of transformer 19 is connected to a suitable source of A.C. supply, not shown. Input supply leads 21 and 22 are connected from secondary winding 18 to the A.C. input side of bridge rectifier 11 at junctions 23 and 24 which completes the circuit to field coil 1. Bias winding 10 is connected in a series relationship to a variable resistor 25 and a stable source of D.C. potential illustrated as battery 26. Control winding 9 is series connected with a variable limiting resistor 27 and is provided with current by transistor control TR; limiting resistor 27 insures a safe current rating of control winding 9 and is made adjustable so that the gain of the reactor and speed regulation of the control system may be adjusted.

The operation of FIGURE 1 may be more fully understood by the following:

Variable resistor 25 is initially adjusted to permit bias winding 10 to be energized to the extent that a relatively high impedance is offered by power winding 8 due to the hysteresis properties of core 7. Under this condition current flow through clutch coil 1 is substantially blocked and output shaft 4 remains stationary since speed setting potentiometer P-1 of transistor control TR is initially set at zero speed which prohibits current flow through control winding 9.

If the speed setting potentiometer P-1 is now advanced to fifty percent or any desired setting, transistor control TR causes current to flow through limiting resistor 27 and control winding 9. Control winding 9 is energized in a direction to oppose the biasing effect of bias winding 10 and hence reduce the impedance of power winding 8. This action allows current to flow through power winding 8 and hence clutch coil 1 in the following manner: Considering point 28 of transformer 19 instantaneously positive and point 29 instantaneously negative, current flows through lead 21, the upper half of power winding 8, rectifier 12, lead 16, clutch coil 1, lead 17, rectifier 15, lead 22 and to terminal 29. During the subsequent one-half A.C. power cycle current flows from terminal 29 of transformer 19 through lead 22, rectifier 13, lead 16, clutch coil 1, lead 17, rectifier 14, the lower half of power winding 8, and lead 21 to terminal 28.

Current flow through clutch coil 1 causes output shaft 4, generator G and the load to rotate in accordance with principles well established in the eddy current coupling art. The amount of current flow through field coil 1 and hence the rotational speed of output shaft 4 is directly dependent upon the current output of transistor control TR through control winding 9. To maintain a load speed at a preset setting established by speed setting potentiometer P-1, the voltage developed by generator G proportional to its angular velocity is matched against the speed setting voltage in transistor control TR which compensates for inceptive variations in output shaft speed and load changes.

It therefore becomes apparent that speed regulation of dynamoelectric machines of the type described utilizing a sensitive speed responsive transistorized control circuit as a preamplification means for driving a magnetic amplifier results in faster dynamic response, superior control and better performance than that found in known systems.

Figure 2:
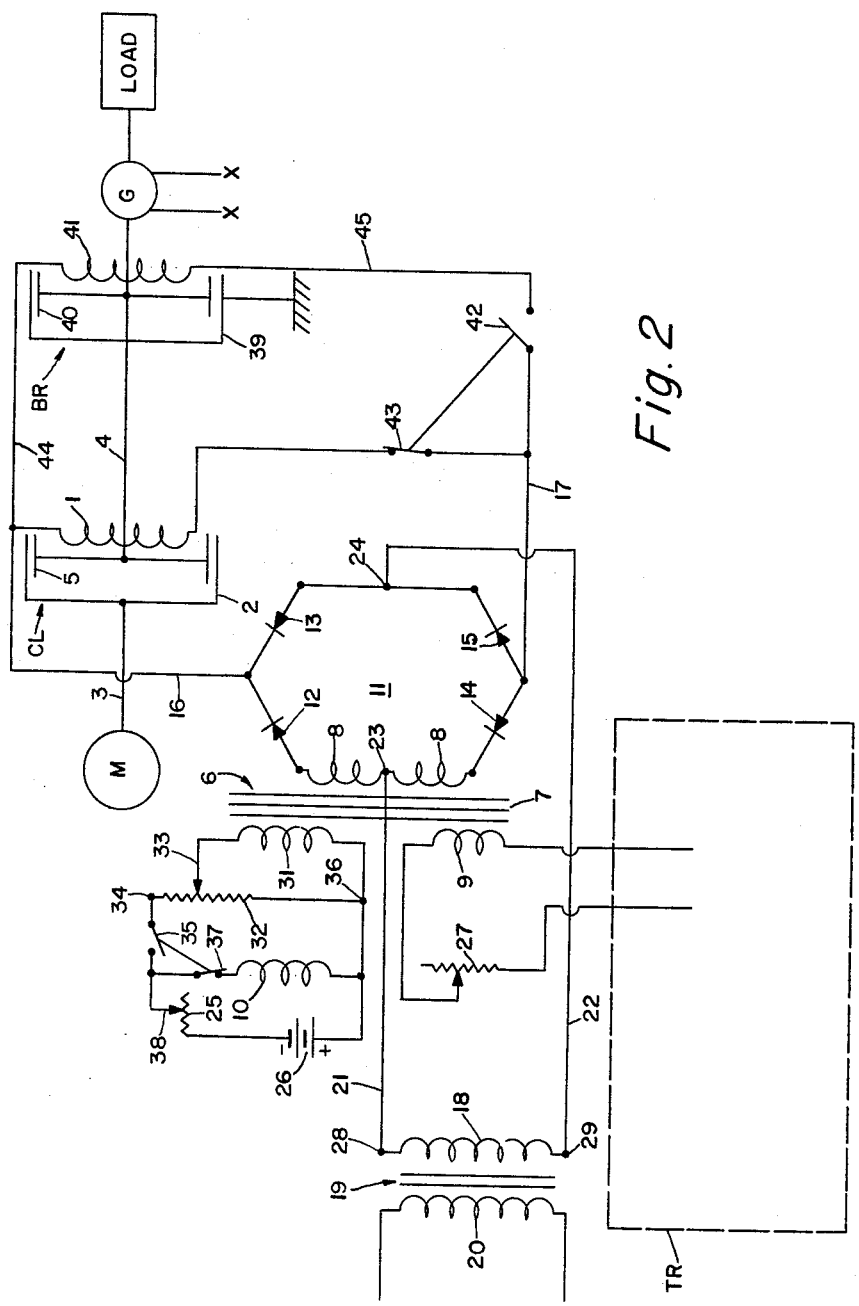
FIGURE 2 is a basic speed control system with a stopping brake.

The electrical control shown in FIGURE 2 is similar in scope to FIGURE 1 and includes an electromagnetic brake BR mechanically coupled to an electromagnetic clutch CL which provides controlled brake excitation for stopping. The primary difference between FIGURE 1 and FIGURE 2 lies in the bias circuit which includes an additional bias winding shown as brake bias winding 31 connected across a potentiometer 32 having an adjustable arm 33.

One end of potentiometer 32 is connected at a point 34 to a normally open single-pole, single-throw knife switch 35 and the other end of said potentiometer is connected at a point 36 to one end of bias winding 10. The other end of bias winding 10 is connected to one side of a normally closed single-pole, single-throw knife switch 37 and the other side of throw switch 37 is connected to one side of throw switch 35 and also to arm 38 of adjustable resistor 25. The other side of resistor 25 is connected to one side of a stable source of D.C. potential illustrated as battery 26 and the other side of battery 26 is connected to the direct junction of bias winding 10 and potentiometer 32. Brake BR consists of a relatively fixed stator 39, a driven member 40 and a brake coil 41. Brake coil 41 and a normally open throw switch 42 are connected across clutch coil 1 which has connected thereto a normally closed switch 43.

It is obvious that with switches 37 and 43 closed and switches 35 and 42 open, the biasing effect of winding 10 and the subsequent control and energization of clutch field coil 1 are identical to that illustrated in FIGURE 1.

In the operation of FIGURE 2 assume that switches 37 and 43 are closed, clutch field coil 1 is energized and shaft 4 is rotating. For proper braking action a control switch (not shown) is placed in a stop position. This action immediately disengages normally closed switches 37 and 43 and simultaneously closes switches 35 and 42; transistor control winding 9 is also disengaged by this action through a switch means (not shown). Clutch field coil 1 excitation is therefore transferred to brake field coil 41 through leads 44 and 45 and the magnetic amplifier bias is transferred from bias winding 10 to bias winding 31, both of which are identical. Potentiometer 32 has considerably more resistance than bias winding 31 and when potentiometer arm 33 is set at point 34, the bias on magnetic amplifier 6 is the same as it would be if potentiometer 32 and bias winding 10 were not in the circuit. Since control winding 9 is disengaged and bias winding 31 is energized, power winding 8 exhibits a relatively high impedance and therefore current through brake coil 41 would be negligible under these conditions; at the same time shaft 4 is decelerating. To develop a controlled braking action potentiometer arm 33 is now advanced in the direction of point 36; current through winding 31 is thereby decreased and its biasing effect is consequently decreased. This action places power winding 8 in a relatively low impedance state thereby permitting an increased current flow to brake winding 41 to provide a braking effect well known in eddy current brake devices.

This control circuitry therefore provides brake excitation from zero to one hundred percent in conjunction with the basic transistor magnetic amplifier speed control system illustrated in FIGURE 1. In practice, one hundred percent brake excitation is reached before potentiometer arm 33 reaches point 36 and therefore unless a resistance having a value several times the resistance of bias winding 31 is left in the circuit, response of the reactor 6 would be effected since bias winding 31 would be effectively shorted.

Figure 3:
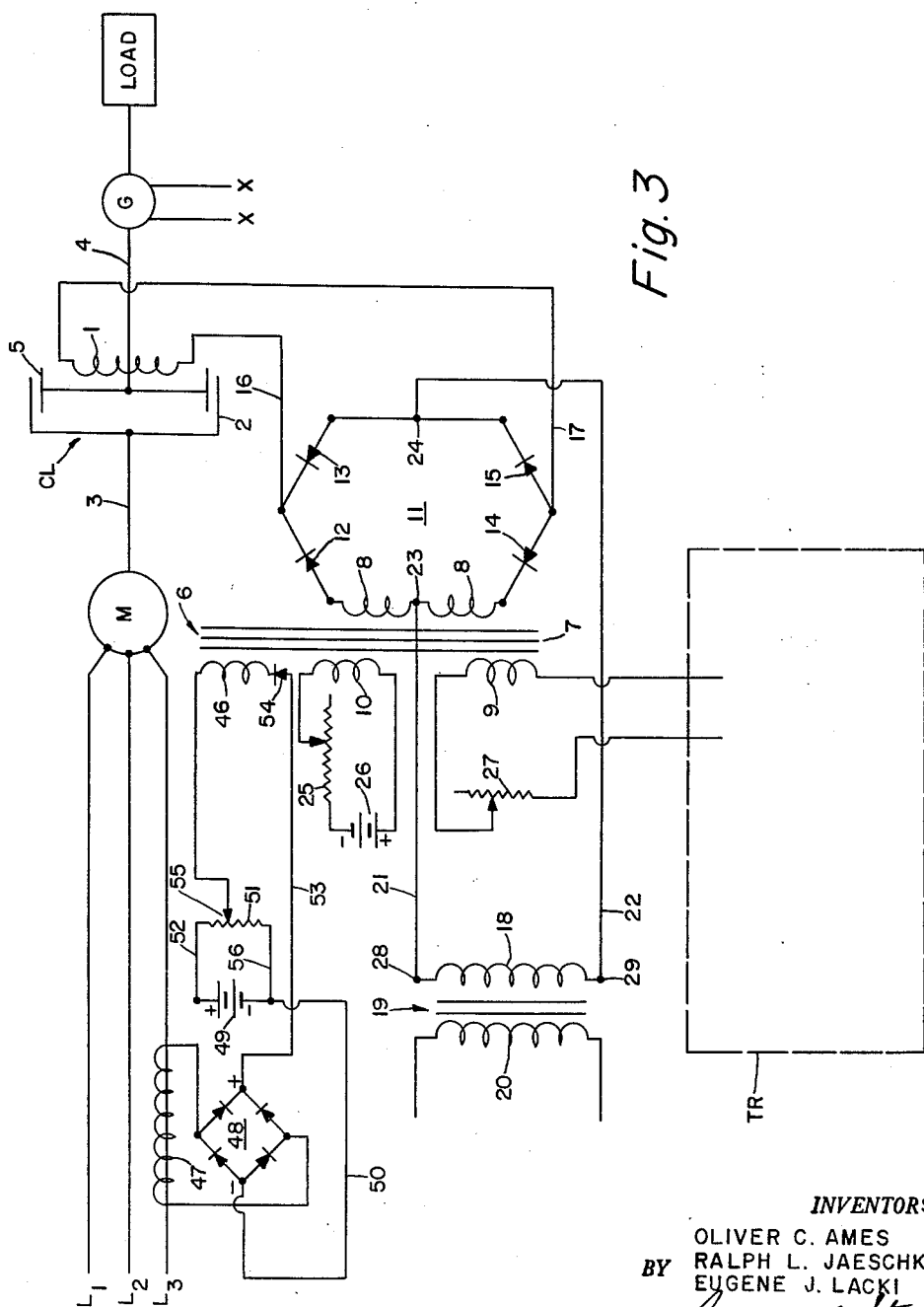
FIGURE 3 is a circuit diagram of a basic speed control system, as shown in FIGURE 1, with an adaptation illustrating torque limit control.

FIGURE 3 is the third embodiment of our invention and incorporates the provision of torque limiting circuitry to prevent overloading of prime mover M in addition to the transistorized magnetic amplifier speed regulating features illustrated in FIGURE 1.

The structure of FIGURE 3 is similar in scope to FIGURE 1 but includes a torque limiting winding 46 wound on magnetic amplifier 6 in addition to bias winding 10, control winding 9 and power winding 8.

Since torque transmitted by prime mover M, shown as a polyphase induction motor, is relatively proportional to current drawn through a supply line of said motor, a current transformer 47 is connected in one supply line illustrated as L-3. The output leads of current transformer 47 are connected across the A.C. terminals of a bridge rectifier 48 and the A.C. torque output signal from current transformer 47, proportional to developed torque, is rectified by bridge rectifier 48. The negative terminal of a stable D.C. potential, shown as battery 49, is connected through a conductor 50 to the negative D.C. output side of bridge rectifier 48. The negative terminal of battery 49 is also connected to one end of a potentiometer 51 and the other end of potentiometer 51 is connected to the positive terminal of battery 49 through a conductor 52. The positive D.C. output side of bridge rectifier 48 is connected via a conductor 53 to the anode of a rectifier 54. The cathode of said rectifier is connected to one end of torque limiting winding 46 and the other end of winding 46 is connected to a potentiometer arm 55. Torque limiting winding 46 is wound in a direction such that current flow through said winding acts to aid the biasing effect of current flow through bias winding 10.

It may readily be seen that the D.C. potential, a torque reference signal, developed between potentiometer arm 55 and a lead 56 is in series opposition to the D.C. potential developed across bridge rectifier 48 and that current will flow from the positive side of bridge rectifier 48 through conductor 53, rectifier 54, torque limiting winding 46, potentiometer arm 55 to conductor 56, and a lead 50 to the negative side of bridge rectifier 48 only if the D.C. torque signal from bridge rectifier 48 exceeds the torque reference signal.

The operation of FIGURE 3 is identical in scope to the speed regulating operation of FIGURE 1 unless torque signal winding 46 becomes energized due to excessive overloading of prime mover M. A torque reference signal is first established by presetting arm 55 of potentiometer 51 to a desired position. The resultant torque reference voltage signal therefore exists between arm 55 and lead 56 connected to said potenitometer. Since rectifier 54 is a unidirectional current device, conventional current may flow only from the positive side of bridge rectifier 48 through lead 53, rectifier 54, torque limiting winding 46, arm 55, to lead 56 and through conductor 50 to the negative side of bridge rectifier 48. Current flow in this direction through winding 46 acts to cut off magnetic amplifier 6 by driving core 7 from its substantially saturated condiiton, thereby reducing current flow through clutch winding 1. This current flow however, is blocked under normal operating conditions since the potential of said torque reference signal is of a larger magnitude than, and in opposition to, the D.C. torque voltage of bridge rectifier 48. If, however, the D.C. potential developed at the output leads 53 and 50 of bridge rectifier 48 exceeds the preset torque reference signal due to increase torque requirements of prime mover M, winding 46 becomes energized indicating the preset torque limitation point of prime mover M has been exceeded. The energization of winding 46 drives core 7 from its saturated condition and power winding 8 reverts to a relatively high impedance state.

This results in reduced current flow from A.C. supply 19 to clutch coil 1 thereby decreasing the coupling effect of coupling CL, reducing the speed of output shaft 4 and preventing the load on prime mover M from rising above the preset desired value.

Figures 4, 6:
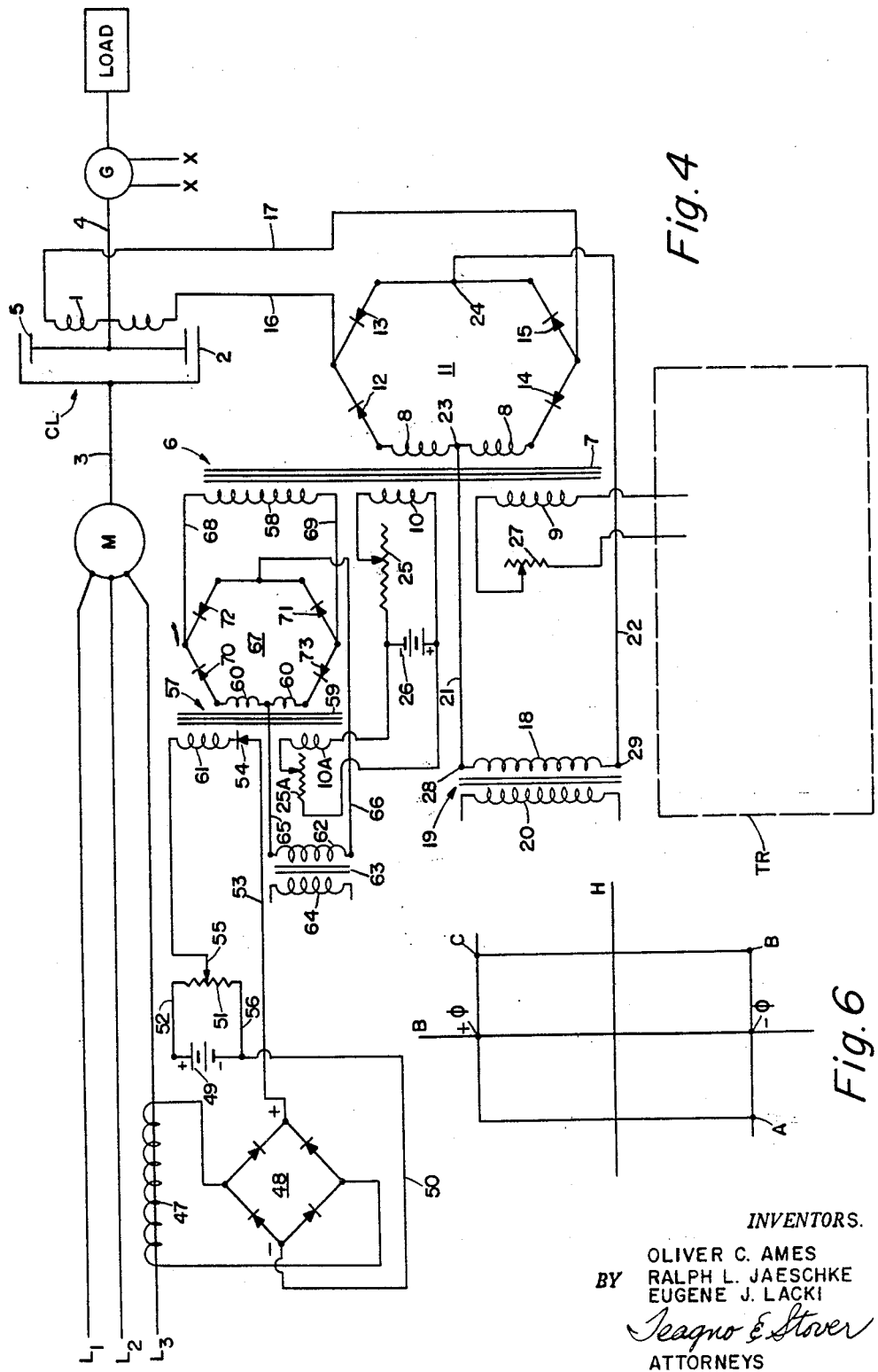
FIGURE 4 is a schematic view, similar in scope to FIGURE 3, showing a modified torque limit control.
FIGURE 6 is a diagram representing the ideal hysteresis loop characteristic of core 59 in FIGURE 4.

The control illustrated in FIGURE 4 is a refinement of the torque limit control circuitry shown in FIGURE 3 and differs primarily by the inclusion of an additional magnetic amplifier 57 which provides sharp control of the input to a torque limiting winding 58 of the first or main magnetic amplifier 6. The remaining structure including main magnetic amplifier 6, with its associated control winding 9, bias winding 10 and power winding 8 is similar in scope and operation to the configuration of FIGURE 3.

Torque limiting winding 58 of FIGURE 4 is not immediately energized in response to an overriding torque voltage signal. This minute delaying action distinguishes over FIGURE 3 which provides an immediate flow of current through torque limiting winding 46 proportional to the overriding torque signal and which results in a proportional decrease in current to clutch field coil 1. Consequently speed regulation of FIGURE 3 with its torque limit control is not as good as it would be without its torque limit control. Although this condition is acceptable in many applications, FIGURE 4 illustrates a control system where close regulation must be obtained with torque limiting.

The torque control circuitry of FIGURE 4 is shown to comprise magnetic amplifier 57 having a magnetic core 59, a center tapped power winding 60, a control winding 61 and a bias winding 10A. Magnetic core 59 is made from material well known in the art having a substantially rectangular hysteresis curve characteristic. Alternating current is fed through magnetic amplifier 57 from a source including secondary 62 of a supply transformer 63 having its primary winding 64 connected to a suitable source of A.C. supply, not shown. Input supply lines 65 and 66 are connected from secondary 62 to the A.C. input side of a bridge rectifier 67, and the D.C. output side of bridge rectifier 67 is connected to torque limiting winding 58 via conductors 68 and 69. Control winding 61 and its associated torque responsive energizing circuitry is similar in structure and operation to winding 46 and its associated circuitry disclosed in FIGURE 3. Torque limiting winding 58 is wound in a direction such that current flow through said winding acts to aid the biasing effect of current flow through bias winding 10.

Bias winding 10A of magnetic amplifier 57 is connected in series relationship to variable resistor 25A and the bias circuitry is shown connected across battery 26 which, as a stable source of D.C. potential, is also illustrated as being connected across bias winding 10 and its associated bias circuitry. Bias winding 10A is wound in a direction such that current flow through said winding has a tendency to drive core 59 into its normally biased state of magnetic saturation; continued energization of winding 61 has a tendency to oppose this biasing effect and drive core 59 to its opposite magnetic state.

To accomplish close regulation with torque limiting action, the operation of FIGURE 4 is as follows: A D.C. torque reference signal is first established between potentiometer arm 55 and lead 56 by presetting arm 55 of potentiometer 51 to a selected position. As previously explained in conjunction with the operation of FIGURE 3, if the D.C. torque voltage signal developed across bridge rectifier 48 exceeds the torque reference signal developed between potentiometer arm 55 and lead 56, current will flow through control winding 61.

The substantially rectangular hysteresis loop of magnetic core 59 is illustrated as an ideal curve in FIGURE 6 and for purposes of simplicity it may be assumed that core 59 is normally biased to its negative saturation state shown at A by properly adjusting resistor 25A. So long as core 59 is biased in a negative direction, the impedance of power winding 60 is high and current flow from A.C. supply source 63 to torque limiting winding 58 is thereby substantially prohibited. Should current flow through control winding 61 at the instance of an overriding torque voltage signal, power winding 60 continues to exhibit high impedance and current flow through clutch coil 1 momentarily remains uneffected by the excessive torque signal developed; this condition exists until a sufficient coercive force is applied by current flow through winding 61 to overcome the constant bias of winding 10A. As illustrated in FIGURE 6, the required coercive force must be of a value to drive said core from point A to the knee of the curve shown at point B. Upon reaching point B, magnetic core 59 is substantiallly instantaneously triggered to its opposite saturated state shown at C. Simultaneously the impedence of power winding 60 changes from a high to a low state resulting in a sharp triggering action of magnetic amplifier 57 and assuming the upper end of secondary winding 62 is instantaneously positive and the lower end is instantaneously negative, current flows through conductor 65, through the upper half of power winding 60, rectifier 70, conductor 68, torque limiting winding 58, conductor 69, rectifier 71, and conductor 66. During the next half A.C. power cycle current flows in a direction through conductor 66, rectifier 72, conductor 68, torque limiting winding 58, conductor 69, rectifier 73, the lower half of power winding 60, and conductor 65.

Energization of torque limiting winding 58 cuts off reactor 6 and sharply reduces the coupling effect of coupling CL. Magnetic core 59 is driven from its positive saturation point C (FIGURE 6) to its negatively biased saturation point A upon termination of excessive torque requirements.

It therefore becomes apparent that the characteristic of magnetic amplifier 57 is such that it provides no output until sufficient current flows in control winding 61 to trigger it and then the output increases very sharply to a maximum. This system therefore not only regulates current flow through clutch coil 1 responsive to an improved torque limiting action but also provides optimum speed regulation below the torque limiting point.

Rectifier 54 shown in FIGURES 3 and 4 may be omitted from the circuitry without distracting from the operational characteristics of the torque limiting system providing bridge rectifier 48 includes rectifiers such as germanium or silicon having high resistance to reverse current flow.

Figure 5:
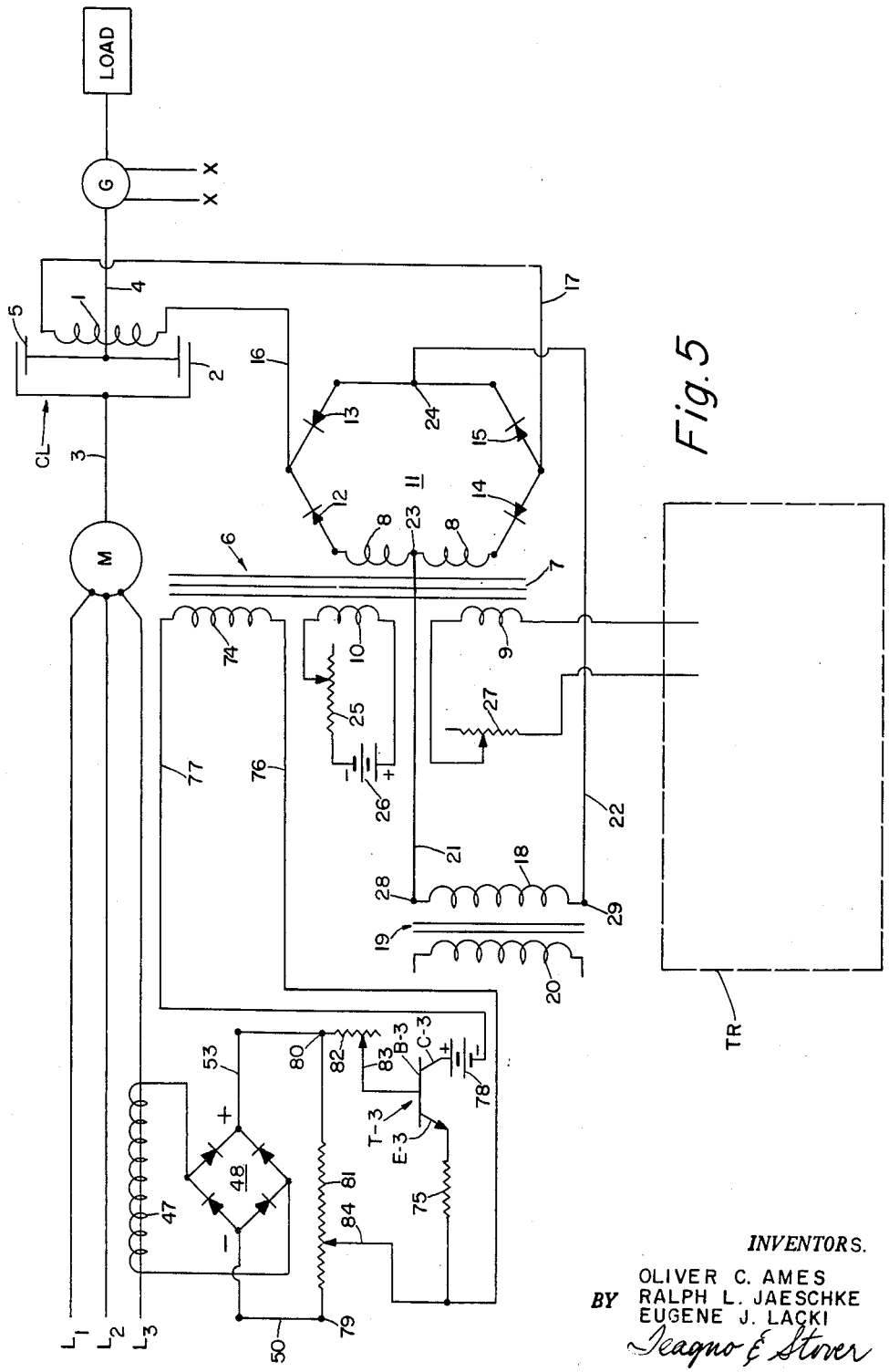
FIGURE 5 shows another schematic representation of FIGURE 3, including a further modification of the torque limit control.

The embodiment of FIGURE 5 is a modification of a transistorized magnetic amplifier control in which a switching transistor circuit replaces the switching reactor 57 of FIGURE 4 for torque limiting. This circuit is somewhat simpler in design than the torque limiting circuit of FIGURE 4 but features the same close regulation advantages.

The structure of FIGURE 5 is similar in scope to the configuration of FIGURE 4 except for the torque limiting circuitry which includes a common-emitter NPN type transistor T-3 having emitter E-3, a collector C-3, and a base B-3. A torque limiting winding 74 is connected in series relationship with emitter E-3, collector C-3, and a current limiting resistor 75 through conductors 76 and 77. The emitter-collector circuit also includes in series therewith a D.C. power source shown as battery 78 having its positive terminal connected to collector C-3 and its negative terminal connected to conductor 77. Current transformer 47 is connected to the A.C. input side of bridge rectifier 48 and the D.C. output leads 53 and 50 of bridge rectifier 48 are series connected at terminals 79 and 80 to a potentiometer 81. The base-emitter circuit of switching transistor T-3 is completed by series connecting the positive side of potentiometer 81 at terminal 80 to one end of an adjustable base current limiting resistor 82, connecting the other side of resistor 82 to base B-3 via an adjustable arm 83, and series connecting emitter E-3 to the negative side of potentiometer 81 via current limiting resistor 75 and an arm 84. Variable resistor 82 limits the base current and controls the sensitivity or gain of transistor T-3. Torque limiting winding 74 is wound in a direction such that current flow through said winding acts to aid the biasing effect of current flow through bias winding 10. The remaining elements, parts and structure of FIGURE 5 have identifying characters similar to FIGURE 4 and the speed control operational characteristics are closely related to the operation of FIGURE 4 hereinbefore explained.

To energize torque limiting winding 74 which increases the bias on magnetic amplifier 6 and reduces the amount of current flow through clutch coil 1 to compensate for excessive torque, transistor T-3 must be triggered to its "on" state. Transistor T-3 is normally biased to a non-conducting or "off" state by selectively applying between base B-3 and emitter E-3 a segment of the torque signal developed across potentiometer 81 between arm 84 and point 80. When the D.C. output potential developed across bridge rectifier 48 is increased due to excessive torque demands the torque reference signal between arm 84 and point 80 is increased beyond its preset value and transistor T-3 is thereby triggered to its "on" state. This action activates the collector-emitter circuit and due to the inherent characteristics of transistor T-3 current flow through torque limiting winding 74 increases sharply via emitter E-3, resistor 75, conductors 76 and 77, battery 78, and collector C-3. The impedance of power winding 8 is therefore increased substantially by the biasing effect of energized torque limiting winding 74 and current flow from A.C. supply source 19 through clutch field coil 1 is reduced sharply to compensate for exceeding the predetermined torque limitation point.

The operating characteristics of this configuration with its torque limiting circuitry controlled by a switching transistor are shown to include a simplified design wherein optimum speed regulation below the torque limiting point is maintained.

It is to be understood that although an NPN type transistor is illustrated in FIGURE 5, a PNP type transistor may readily be substituted therefore simply by reversing required polarities, etc.

It is to be further understood that our transistorized magnetic amplifier control circuitry is equally applicable to other types of electromagnetic devices such as brakes and dynamometers. In addition, it should also be noted that the hereinbefore described main reactor or magnetic amplifier may be biased off or on and the transistor preamplifier control may be used to provide the desired form of operation. For example, in clutch speed control the reactor is normally biased off and this is primarily due to the fact that the transistor control TR provides no output at zero speed. On the other hand, in speed control of a brake the reactor is commonly biased for one hundred percent excitation on the verge of decreasing at zero speed and the polarity of the control winding is such that as the transistor preamplifier control TR output increases, the brake excitation decreases. Further, a step-up transformer or any suitable device may be coupled in a well known manner between the current transformer and the torque signal bridge rectifier to increase the magnitude of torque voltage signals.

In view of the above, it will be seen that the several objects of the invention are achieved and other advantageous results attained.

Since many changes could be made in the above constructions without departing from the scope of the invention, it is intended that all matter contained in the above description or shown in the accompanying drawings shall not be interpreted in a limiting sense but shall be considered illustrative of our invention.

We claim as our invention:

1. An electric control for an electromagnetic coupling apparatus having a driven member, a driving member, a rotating shaft and a field coil for regulating the speed of said shaft comprising a generator driven by said shaft producing a signal voltage proportional to said shaft speed, a magnetic amplifier means having a power winding circuit, a relatively fixedly energized bias circuit and a directly energizable control circuit, an output circuit connecting said power winding circuit to said field coil and an A.C. supply source connected to said power winding circuit, and a speed responsive transistor preamplifier means including at least one transistor having an emitter-collector circuit connected to said control circuit, said transistor preamplifier coupled to said generator signal voltage for controlling energization of said control winding thereby providing sensitive excitation of said field coil for regulating said shaft speed, an electrical motor coupled to said apparatus, said magnetic amplifier further including a torque limiting circuit, said torque limiting circuit comprising a torque limiting winding, a second A.C. supply source connected to said torque limiting winding, said torque limiting winding being responsive to energization only at the instance of a torque voltage signal in excess of a fixed predetermined potential.

2. An electric control for an electromagnetic coupling apparatus having a driven member, a driving member, a rotating shaft and a field coil for regulating the speed of said shaft comprising a generator driven by said shaft producing a signal voltage proportional to said shaft speed, a magnetic amplifier means having a power winding circuit, a relatively fixedly energized bias circuit and a directly energizable control circuit, an output circuit connecting said power winding circuit to said field coil and an A.C. supply source connected to said power winding circuit, and a speed responsive transistor preamplifier means including at least one transistor having an emitter-collector circuit connected to said control circuit, said transistor preamplifier coupled to said generator signal voltage for controlling energization of said control winding thereby providing sensitive excitation of said field coil for regulating said shaft speed, an electrical motor coupled to said apparatus, said magnetic amplifier further including a torque limiting circuit means, said torque limiting circuit means comprising a fixed D.C. potential with means for producing an adjustable reference voltage connected thereacross, said reference voltage means connected in series opposition to a motor torque voltage applied to a torque limiting winding and a unidirectional current device, whereby said torque limiting winding is energized when a predetermined torque reference potential is less than the applied motor torque signal.

3. In a control system for a dynamoelectric machine having a driven member, a driving member, a field winding, and a shaft comprising a voltage signal producing generator driven by said shaft, a magnetic amplifier means having a plurality of windings thereon, including a relatively fixedly energized bias circuit, and a directly energizable control winding, the output of said magnetic amplifier means connected to said field winding, means connected to said magnetic amplifier means for providing a power source, and a speed responsive preamplifier means coupled to one of said plurality of windings, said preamplifier means including at least one transistor having an emitter-collector circuit connected to said control winding and responsive to said voltage signal, whereby current flow through said field winding is sensitively controlled by the activation of said preamplifier means, a second field coil, said bias circuit including first and second bias windings, means to alternately connect the output from said magnetic amplifier means to said first and second field coils whereby alternate energization of said first and second field coils is responsive to the respective energization of said first and second bias windings.

4. In a control system for a dynamoelectric machine having a driven member, a driving member, a field winding, and a shaft comprising a voltage signal producing generator driven by said shaft, a magnetic amplifier means having a plurality of windings thereof, including a relatively fixedly energized bias circuit, and a directly energizable control winding, the output of said magnetic amplifier means connected to said field winding, means connected to said magnetic amplifier means for providing a power source, and a speed responsive preamplifier means coupled to one of said plurality of windings, said preamplifier means including at least one transistor having an emitter-collector circuit connected to said control winding and responsive to said voltage signal, whereby current flow through said field winding is sensitively controlled by the activation of said preamplifier means, a second field coil, said bias circuit including first and second bias windings, means to alternately connect the output from said magnetic amplifier means to said first and second field coils whereby alternate energization of said first and second field coils is responsive to the respective energization of said first and second bias windings, said bias circuit further includes a D.C. potential and an adjustable resistor alternately connected in series relationship to said first and second bias windings.

5. An electric control for varying the energization of a field coil in a coupling apparatus having a driven member, a shaft, a driving member, and an electrical motor connected thereto, comprising a generator driven by said shaft having an output circuit providing a voltage signal proportional to said shaft speed, a first magnetic amplifier having a relatively fixedly energized bias circuit, a directly energizable control winding, a torque limiting winding means, and at least one power winding, an A.C. source connected to the input of said power winding and means connecting the output of said power winding to said field coil, a speed responsive transistor preamplifier means including at least one transistor having an emitter-collector circuit series connected to said control winding, said generator output circuit connected to said preamplifier means, a second magnetic amplifier having a magnetic core, a torque responsive control winding means, a bias control means and at least one output power winding, and a second A.C. supply circuit connected to the input side of said output power winding and maens connecting the output side of said output power winding to said torque limiting winding means whereby energization of said field coil is responsive to current flow through said control winding and said torque limiting winding means.

6. An electrical control as set forth in claim 5 wherein the hysteresis loop characteristic of said magnetic core of said second magnetic amplifier is substantially rectangular.

7. An electrical control as set forth in claim 5 in which said means connecting said output power winding to said torque limiting winding comprises a bridge rectifier, said torque limiting winding means being sharply responsive to current flow only after the coercive force applied by said torque responsive control winding exceeds a predetermined value.

8. An electrical control as set forth in claim 7 in which said torque responsive control winding means comprises a torque responsive control winding and a reference voltage source connected in series opposition to a developed motor torque voltage wherein said torque responsive control winding is energized when the developed motor torque voltage exceeds the potential of the reference voltage source.

9. An electrical control for varying the energization of a field coil in a coupling apparatus having a driving member, an electrical motor connected thereto, a driven member, and a shaft, comprising a generator driven by said shaft having an output circuit providing a voltage signal proportional to said shaft speed, a magnetic amplifier having a relatively fixedly energized bias circuit, a directly energizable control winding means, a torque limiting winding and at least one power winding, an A.C. source connected to said power winding, means connecting the output of said power winding to said field coil, a speed responsive preamplifier control means including at least one transistor having an emitter-collector circuit series connected to said control winding means, said generator output circuit connected to said preamplifier means and a torque responsive semiconductor switching means having its output circuit connected to said torque limiting winding means whereby energization of said field coil is controlled by current flow through said control winding and said torque limiting winding means.

10. An electrical control as described in claim 9 in which said torque responsive semiconductor switching means comprises at least one common emitter type transistor having a base, a collector and an emitter, said torque limiting winding means being in series relationship to said collector and emitter, whereby current flow through said torque limiting winding means increases sharply upon triggering said transistor to its ON position.

11. An electrical control as set forth in claim 9 wherein said torque responsive semiconductor switching means comprises a transistor having a base-emitter circuit and a collector-emitter circuit, said collector-emitter circuit connected in series relationship with said torque limiting winding means and said base-emitter circuit series connected to a variable torque responsive voltage signal source whereby said torque limiting winding means is sharply energized when said torque responsive voltage signal exceeds a predetermined value.

References Cited in the file of this patent
UNITED STATES PATENTS

| | | |
|---|---|---|
| 2,697,794 | Jaeschke | Dec. 21, 1954 |
| 2,721,305 | Steinitz | Oct. 18, 1955 |
| 2,769,931 | Allen | Nov. 6, 1956 |
| 2,809,343 | Pittman | Oct. 8, 1957 |
| 2,850,654 | Jaeschke | Sept. 2, 1958 |
| 2,885,619 | Wengryn | May 5, 1959 |
| 2,949,249 | Gravenstreter | Aug. 16, 1960 |